(12) United States Patent
Grabau (10) Patent No.: US 9,897,075 B2
(45) Date of Patent: Feb. 20, 2018

(54) WIND FARM (71) Applicant: ENVISION ENERGY (JIANGSU) CO., LTD, Jiangyin (CN)

(72) Inventor: Peter Grabau, Kolding (DK)

(73) Assignee: ENVISION ENERGY (JIANGSU) co., LTD. (CN)

( * ) Notice: Subject to any disclaimer, the term of this patent is extended or adjusted under 35 U.S.C. 154(b) by 100 days.

(21) Appl. No.: 15/037,211

(22) PCT Filed: Nov. 20, 2014

(86) PCT No.: PCT/EP2014/075149
§ 371 (c)(1),
(2) Date: May 17, 2016

(87) PCT Pub. No.: WO2015/075123
PCT Pub. Date: May 28, 2015

(65) Prior Publication Data
US 2016/0281685 A1    Sep. 29, 2016

(30) Foreign Application Priority Data
Nov. 21, 2013  (DK) .................................. 2013 00657

(51) Int. Cl.
*F03D 9/00* (2016.01)
*F03G 6/00* (2006.01)
(Continued)

(52) U.S. Cl.
CPC ............. *F03D 9/007* (2013.01); *F03D 1/00* (2013.01); *F03D 3/005* (2013.01); *F03D 9/257* (2017.02);
(Continued)

(58) Field of Classification Search
CPC .......... F03D 9/007; F03D 9/257; F03D 3/005; F03D 1/00; F03D 9/48; F03D 80/00;
(Continued)

(56) References Cited

U.S. PATENT DOCUMENTS 6,057,606 A    5/2000  Porat
9,709,028 B2 *  7/2017  Freda ........................ F03D 1/04
(Continued)

OTHER PUBLICATIONS

International Search Report prepared by the European Patent Office for International Application No. PCT/EP2014/075149, dated Feb. 19, 2015.
(Continued)

*Primary Examiner* — Hoang Nguyen
(74) *Attorney, Agent, or Firm* — Finnegan, Henderson, Farabow, Garrett & Dunner LLP (57) ABSTRACT

A wind farm comprising a number of wind turbines arranged on a ground comprising a first ground portion having a first ground surface and an outer periphery and a second ground portion having a second ground surface and surrounding the first ground portion. The first ground portion is covered with a reflective artificial covering to provide a reflecting surface having an albedo higher than the albedo of the second ground portion and thereby generating a lower temperature and a higher pressure in the first ground portion than in the second ground portion and a wind having a speed in a direction from the first ground portion towards the second ground portion. Some of the wind turbines are arranged in the second ground portion in such a distance from the periphery of the first ground portion that they are subjected to the wind coming from the first ground portion.

21 Claims, 3 Drawing Sheets

(51) Int. Cl.
- *F03D 80/00* (2016.01)
- *F03D 9/48* (2016.01)
- *F03D 1/00* (2006.01)
- *F03D 3/00* (2006.01)
- *F03D 9/25* (2016.01)

(52) U.S. Cl.
CPC ............... *F03D 9/48* (2016.05); *F03D 80/00* (2016.05); *F03G 6/00* (2013.01); F05B 2240/96 (2013.01); F05B 2240/99 (2013.01); F05B 2280/5005 (2013.01); Y02E 10/725 (2013.01)

(58) Field of Classification Search
CPC .. F03G 6/00; Y02E 10/725; F05B 2280/5005; F05B 2240/99; F05B 2240/96
USPC .......................................... 60/641.8, 398, 698
See application file for complete search history.

(56) References Cited

U.S. PATENT DOCUMENTS

| | | | |
|---|---|---|---|
| 2005/0016165 A1* | 1/2005 | Enis | F03D 9/17 60/398 |
| 2006/0213145 A1* | 9/2006 | Haller | E04H 12/34 52/651.01 |
| 2009/0152370 A1 | 6/2009 | Pesochinsky | |
| 2010/0260925 A1 | 10/2010 | Brady | |
| 2012/0114484 A1* | 5/2012 | Tosello | E02D 27/42 416/10 |
| 2012/0175427 A1 | 7/2012 | Feldman et al. | |

OTHER PUBLICATIONS

Written Opinion prepared by the European Patent Office for International Application No. PCT/EP2014/075149, dated Feb. 19, 2015.
Search Report prepared by the Danish Patent and Trademark Office for Application No. PA 2013 00657, dated Jun. 4, 2014.

* cited by examiner

WIND FARM

TECHNICAL FIELD

The present invention relates to a wind farm comprising a number of wind turbines arranged on a ground.

BACKGROUND

The amount of energy produced by wind farms has increased significantly the last decade, especially in China, and it is expected that the increase will continue in the future. Today, wind farms are established onshore in regions where the wind speed is as low as about 5 m/s. However, in the future, there might be a shortage of regions where it is economically sound to establish wind farms due to low wind speed.

Some regions of the earth are waste lands with less fertile soil, such as deserts or desert-like regions and grassland or grassland-like regions where the amount of wind is so low that they are not suitable for establishing wind farms, but would be well-suited for establishing wind farms if wind were generated.

The problem to be solved by the present invention is to provide means for generating so to say artificial wind and thereby wind farms that are independent of so to say natural wind.

By the term artificial wind is to be understood wind that did not exist in the region in question until the wind-generating means was arranged in the region.

By natural wind is to be understood wind that is caused by natural phenomena of nature, for example where natural wind occurred in the region before and will also occur after establishing the artificial wind-generating means. Natural wind will therefore also be referred to as background wind in the following.

It is known that on sunny days, a sea breeze circulation may develop due to uneven heating of the sea and the land. During the day, the land 5 heats up more than the sea 6, whereby the air over land 5 will be warmer in a low altitude than the air over the sea 6 in low altitude, see FIG. 1. The warm air over the land 5 rises 1 causing low pressure LI at low altitude. Over the sea 6, high pressure HI will form at low altitude because of the colder air, and over the sea 6, air will descent 2 from a low pressure Lh aloft i.e. at high altitude. At low altitude, wind will blow from the higher pressure HI at the sea 6 to the lower pressure LI over land causing a sea breeze 3. The rising air 1 over land is cooled, thus forming an area of high pressure Hh aloft. At this level, the air pressure and air density are higher than at the same level over the sea where the pressure as mentioned is low, whereby a return flow 4 is formed aloft in opposite direction of the sea breeze 3 and the sea breeze circulation completed.

Figure 1:
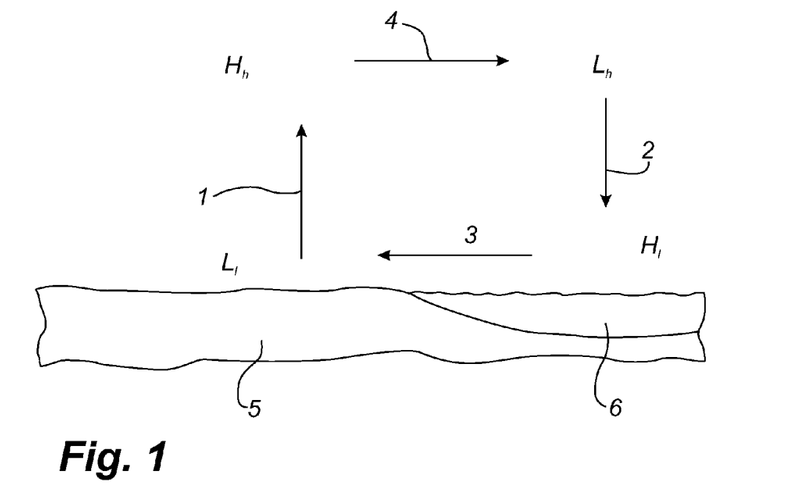
FIG. 1 illustrates the formation of a sea breeze circulation and a sea breeze.

Another and slightly different explanation of how a sea breeze or lake breeze is initiated is as follows:
- the solar radiation heats the air above land 5, and the air above the sea 6 is cooled,
- the air above the sea contracts, and the air above land expands,
- at an altitude the pressure Hh above land is higher than the pressure Lh above the sea.
- As a result of this horizontal pressure gradient, air flows from above land to above sea. This flow is called the return current 4.
- the divergence of air above land causes the surface air pressure over land LI to drop, and convergence of air into the region above the sea causes the surface air pressure HI over the sea to increase,
- the pressure difference at sea surface and at land surface initiates the sea breeze 3.

The difference between the two explanations of the initiation of the sea breeze is whether it is initiated at surface level or at high altitude. Independent of the explanation, the result is that a sea breeze is formed due to different heating of the air above land and above the sea.

The present invention is explained by using the first mentioned explanation of how the sea or lake breeze is initiated. It should however be understood that independent of how the sea or lake breeze is formed, the effect of the present invention is the generation of artificial wind comparable to a sea or lake breeze, and also comparable to a so-called city breeze between a city essentially not heated during the day and an adjacent city heated during the day, and a breeze between two land regions, one being essentially not heated and the other being heated during the day.

From US 2010/0260925 it is further known to increase the terrestrial albedo by applying to the surface of the earth a reflective particulate material.

Further, US 2012/0175427 discloses cooling a land region by means of artificial clouds and heating another land region by means of other artificial clouds in order to cause a wind strengthening from the cooled to the heated region, wind turbines being arranged in the strengthened wind, cf. paragraph [0121].

By the term albedo or reflection coefficient is to be understood the ratio between the energy from the sun radiation reflected from a surface and the incident energy from the sun radiation upon the surface. The albedo is zero for no reflection from a perfectly black surface and 1 for a perfect reflection of a white surface.

SUMMARY OF THE INVENTION

The above problem is according to the present invention solved by a wind farm comprising a number of wind turbines arranged on a ground comprising a first ground portion having a first ground surface and an outer periphery, and a second ground portion having a second ground surface and surrounding wholly or partly the first ground portion, the first ground portion being covered with a reflecting first artificial covering so as to provide the first ground portion with a reflecting surface having a higher albedo than the albedo of the surrounding second ground portion and thereby generating a lower temperature and a higher pressure in the first ground portion than in the second ground portion and as a result thereof, a wind having a wind speed in a direction from the first ground portion towards the second ground portion, and at least some of the wind turbines being arranged in the second ground portion in such a distance from the periphery of the first ground portion that they are subjected to the wind coming from the first ground portion.

All the wind turbines can be arranged in such a distance from the periphery of the first ground portion that they are all subjected to the wind coming from the first ground portion.

At least 10, 20 or 30 wind turbines can be arranged in the second ground portion.

Corresponding to the formation of a sea breeze circulation and a sea breeze from the colder sea to the warmer land, an albedo of the reflecting surface of the first artificial covering of the first ground portion 16 higher than the albedo of the surface of the surrounding second ground portion 15 will cause a lower temperature in the first ground portion than in the surrounding second ground portion and thereby a lower temperature and a higher pressure HI in the air in low altitude above the reflecting surface of the first ground portion 16 than above the surface of the second ground portion 15. As a result, an air circulation is formed comprising:

- at a low level, an air flow 13 from a high pressure zone HI of more dense air in the colder first ground portion 16 to a low pressure zone LI of less dense air in the warmer second ground portion 15,
- at a high level, an opposite return air flow 14 from a high pressure zone Hh above the mentioned low pressure LI zone at the low level to a low pressure zone Lh above the mentioned high pressure zone at the low level,
- in the second ground portion 15, rising air flow 11 from the low pressure zone LI at low level to the high pressure zone Hh at high level, and
- in the first ground portion 16 a descending air flow 12 from the mentioned low pressure zone Lh at high level to the high pressure zone HI at low level.

The mentioned air flows form an air flow circulation comparable to the sea or lake breeze circulation. Wind turbines 17 arranged in the second ground portion are subjected to the air flow or wind 13 at low altitude from the first ground portion 16 to the surrounding second ground portion 15. Therefore, the wind 13 at low altitude and the speed thereof is in relation to the present invention the most interesting air flow or wind of the air flow circulation.

As a rough approximation, the air flow circulation can be estimated by using a simple formula for describing a sea breeze circulation. A simple formula for calculating the mean wind speed in a sea breeze circulation is:

$$\bar{u} \approx \frac{R \ln(p_0/p_1)(\bar{T}_2 - \bar{T}_1)}{2kL}$$

where:

$\bar{u}$[m/s] is the mean wind speed in a sea breeze circulation (without any disturbing background wind, i.e. natural wind), R=287 J/kg K (the gas constant for dry air), $\bar{T}_1$[K] is the mean air temperature in the air blowing downwardly, i.e. descending in the first ground portion, $\bar{T}_2$[K] is the mean air temperature in the air blowing upwardly, i.e. ascending in the second ground portion, k[s$^{-1}$] s is the Guldberg-Mohn friction coefficient. It ranges from 0.02 s$^{-1}$ near the coast or over the ocean to 0.08 s$^{-1}$ over the continent, $p_0$[Pa] is the air pressure at the ground surface, $p_1$[Pa] is the air pressure in the returning flow, L[m] is the horizontal distance between the maximum wind speed blowing upwardly and the maximum wind speed blowing downwardly.

As it will appear below, the potentials are high for generating wind from the first to the second ground portion with sufficient speed for providing wind farms of interest according to the invention.

For theoretical considerations, the wind from the first to the second ground portion can be considered an essential horizontal wind, and the term horizontal or essentially horizontal wind is used in the following. However, in practice, it may form an angle to the surface that may be as high as 30 degrees.

As an example, if choosing a hot summer day in a desert and a 1 km$^2$ highly reflecting and smooth surface of the covering of the first ground portion, then:

$\bar{T}_1$=10 C (283 K)

$\bar{T}_2$=35 C (308 K)

k=0.02 s$^{-1}$ (the value for ocean is chosen if the highly reflective surface and the desert are very smooth)

$p_0$=100,000 Pa (the wind farm is located slightly above sea level)

$p_1$=90,000 Pa (representing a circulation that has a height at approximately 700 m)

L=2 km (the radius of a 1 km$^2$ mirror is 564 m, and there will be a mixing area with cooler air behind the turbines), then the mean vertical wind speed above the mirror, $\bar{u}$, is 9.45 m/s.

The horizontal wind speed at the position of the wind turbines is likely to be significantly higher than the vertical wind speed above the mirror. In an absolutely best case scenario, the wind speed at the turbines will be 2.8 times higher than the vertical wind speed, assuming that all the horizontal wind will be situated within the rotor diameter of the turbines, which is 100 meter above ground. The theoretically essential horizontal wind speed will therefore as a maximum be 26 m/s. In practice, the wind speed will be somewhat lower but still at an interesting level for a wind farm.

The mean wind speed in the circulation is, according to the simplified formula, directly proportional with the difference in air temperature in the downwardly and upwardly blowing wind, which is why a region with many sunny days is a preferred site for the wind farm.

On the other hand, the mean wind speed is inversely proportional with the horizontal distance between the downwardly and upwardly blowing wind L and the friction coefficient$^k$, which is why a smooth surface of the reflecting surface of the first ground portion and the surface of the second ground portion is a preferred site for the wind farm. Alternatively, the surface of the site can be leveled to provide the desirable surface for the wind farm.

In an embodiment, the first covering is formed by a liquid or granular coating applied to the first ground portion so as to provide the reflective surface with high albedo.

The liquid or granular coating is preferably light-colored natural minerals or based on light-colored natural minerals.

In an, at present, preferred embodiment of the invention, the first covering is formed by a plurality of flexible or rigid mirrors or mirror-like sheet elements arranged in the first ground portion. Advantageously, a high albedo is thereby obtained and thereby a high reflection of sun energy.

The mirror or mirror-like rigid sheets may comprise a rigid highly transparent upper layer, such as a glass or polymer layer, a subjacent metal layer such as a sheet or foil of metal or a metallization layer and a lower layer. As the metal and metallization layer, a layer known or suitable for reflecting light can be used, a suitable material being aluminum.

The flexible mirrors or mirror-like flexible sheets may comprise the same layers as mentioned above except a glass layer for the upper layer.

The mirrors or mirror-like rigid sheets can be mutually connected along edges thereof and formed into a coil that can be rolled out on the site for the farm. Correspondingly, a flexible sheet can be a long sheet that is coiled up and can be rolled out on the site for the wind farm.

The reflecting first covering can be arranged directly on the first ground surface. The reflecting first covering can, however, also be anchored in the first ground portion to prevent that it is removed.

According to an embodiment, an insulating layer is arranged between the reflective first covering and the first ground surface, thereby assisting in keeping the first ground portion at a desirable low temperature. The insulating layer can be a separate part or form a part of the reflecting covering, i.e. be attached to the lower layer as a bottom layer. The insulating layer can be a sheet of foamed polymer, glass wool or stone wool.

In order to obtain a suitable temperature difference between the air above the first and second ground portion, the albedo of the reflective first covering can be at least 50%, alternatively 60%, alternatively 70%, alternatively 80%, alternatively 90%.

The reflecting surface is according to an embodiment chosen such that the difference between the albedo of the first ground portion and the second ground portion is at least 30%, 40%, 50%, 60%, 70% or 80%.

Further, the albedo of the reflecting surface can be chosen such that a temperature difference of at least 1, 2.5, 5, 10, 15, 20, 25, 30 or 35 degrees Celsius occurs during a sunny summer day between the temperature of the first ground portion and the second ground portion.

As it appears from the previous example, theoretically, a usable wind speed is obtainable at a relatively low area of the reflecting first covering when the temperature difference between the air above the first and second ground portion is relatively high. At lower differences between the mentioned temperatures, it is expected that the area of the reflecting covering needs to be greater in order to obtain suitable wind speed.

Therefore, the area of the reflecting surface can be at least 0.3, 0.5, 1.0, 1.5, 2.0, 2.5, 3.0, 4.0, 5.0, 10, 20, 30, 40 or 50 $km^2$.

Further, the area of the first ground portion with the reflecting surface and the difference in albedo between the first and the second ground portion can be chosen such that a temperature difference of at least 1, 2.5, 5, 10, 15, 20, 25, 30 or 35 degree Celsius occurs during a sunny day between the temperature of the first ground portion and the second ground portion.

Additionally, according to an embodiment, the area of the first ground portion with the highly reflective surface and the difference in albedo between the first and the second ground portion are chosen such that a temperature difference of at least 1, 2.5, 5, 10, 15, 20, 25, 30 or 35 degree Celsius occurs during a sunny summer day between the temperature of the first ground portion and the second ground portion and at least one of the wind turbines is subjected to a wind speed of at least 2 m/s, 3 m/s, 4 m/s, 5 m/s or 6 m/s.

As mentioned previously, the mean wind speed in the wind circulation is, according to the simplified formula, inversely proportional with the friction coefficient between the surface of the first and also second ground portion and the wind. It is therefore desirable that the friction coefficient provides smooth surfaces in the mentioned ground portion. Therefore, according to an embodiment, the covering of the first ground portion has a surface providing a Goldberg-Mohn friction coefficient k between said surface and the wind of less than 0.1, 0.08, 0.05, 0.04 or 0.03 $s^{-1}$.

In order to increase the difference in albedo of the first and second ground portion, the second ground portion can be covered with a second artificial covering with a low albedo, such as a dark colored covering, e.g. a black covering.

The second covering can be formed by a granular or liquid coating applied to the second ground portion so as to provide the low albedo.

The coating can advantageously be natural minerals or based on natural minerals.

The second covering can, however, also be formed by a plurality of flexible or rigid sheet elements arranged the second ground portion.

The second covering can be anchored in the second ground portion.

In order to obtain a smooth reflecting surface the first covering can be arranged and/or supported on a leveled surface.

Correspondingly, the second ground surface can have a leveled and smooth ground surface in order to provide a low friction coefficient.

In order to further increase the strength of the wind circulation, the surface of the reflective first covering may comprise a material having high infrared emission coefficient so that infrared light is emitted during the night, such as having the color natural white. Alternatively, the first ground portion being covered with the reflective first covering can be covered with a covering with a high emission coefficient during the night, such as a black covering. The first covering can also be selected as a compromise between high reflectivity and a high emissivity, however, high reflectivity being the most important property.

Correspondingly, the preferred covering of the second ground portion having a low reflection coefficient may comprise a material with low infrared emission so that infrared light is less emitted during the night. Again, the choice of material for the second covering can also be a compromise between low reflection coefficient and low emission of infrared light. However, low reflection coefficient being the most important property.

In an, at present, preferred embodiment, at least some of the wind turbines in the second ground portion are arranged on a line being essentially parallel with the periphery of the first ground portion so as to be arranged essentially in the same distance from said periphery.

In a further embodiment, at least some of the wind turbines in the second ground portion are arranged on a closed curve being essentially parallel with the periphery of the first ground portion so as to be arranged in essentially the same distance from said periphery.

In another, at present, preferred embodiment of the invention, at least some of the wind turbines are of the so called Danish type Horizontal Axis Wind Turbine (HAWT) comprising a tower and on top of the tower a nacelle with a rotor provided with three blades, alternatively one or two blades.

The wind turbines can be of the upwind or downwind type. At present, the upwind type is preferred.

The wind turbines can be provided with a yaw system so as to be able to rotate the nacelle so that the rotor faces the wind.

The wind turbines can also be provided with blades that can be pitched. If the blades can be pitched 180 degrees or more, such as about 210 degrees, the wind turbine can run both as an upwind and downwind type.

It is believed that the wind flowing downwardly towards the first ground portion may gradually change into an essentially horizontal wind. It can therefore be advantageous that the rotor axis and preferably also the nacelle of the wind turbines are tilted upwardly so that it is essentially parallel with the wind coming from the first ground portion.

The tilt of the axis can be highest for the wind turbines closest to the periphery of the first ground portion and decrease with increasing distance from the periphery of the first ground portion. It can be up to 25, 30 or 35 degrees. In general, the tilt can be at least 5, 10, 15, 20, 25 or 30 degrees.

Even though they in general are not as efficient as wind turbines of the Danish type, at least some of the wind turbines are Vertical Axis Wind Turbines (VAWT), such as Darrieus wind turbines, H-bar turbines, Giromill wind turbines or Savonius wind turbines.

The different types of VAWT can also be installed with the axis arranged horizontally.

In order to improve the yield of the wind farm, barriers and/or wind guides can be provided between adjacent wind turbines, said wind barriers and/or wind guides being arranged so as to reduce the amount of wind leaving the first ground portion without passing the area covered by the rotor.

The first ground portion with the reflecting surface can have a shape with a high area to circumference ratio, such as a circular, elliptical or square shape.

It should, however, be noted that the first ground portion can also have an elongated or oblong shape.

The shape chosen for the first ground portion having the reflecting surface may depend on possible background wind and the speed thereof. If there is no or very little background wind, an essentially circular or elliptical shape may be preferred. A more oblong or elongated shape may be preferred if there are periods with background wind at the site of the wind farm.

Finally, it should be noted that the first and the second ground portion can also have a shape of a linear belt. Additionally the wind farm can comprise alternating first and second ground portions, such as linear belt shaped portions, the wind turbines being arranged in the second ground portions.

BRIEF DESCRIPTION OF THE FIGURES

Embodiments of the invention are described below with reference to the drawings in which.

DETAILED DESCRIPTION OF THE INVENTION

As illustrated in FIG. 1 and described previously, a sea breeze circulation may be formed during a sunny day, and thereby a sea breeze from the sea to the land.

An embodiment of a wind farm according to the invention is now described with reference to FIG. 2 to FIG. 6.

Figure 2:
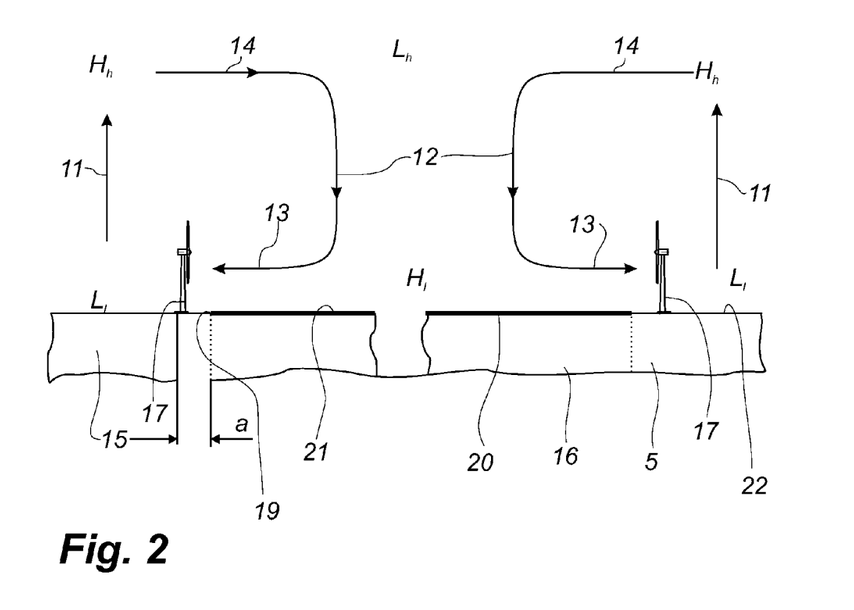
FIG. 2 illustrates the formation of air flow circulation and an essentially horizontal wind from a first to a second ground portion of a wind farm according to the invention as seen in a vertical sectional view of FIG. 3.
Figure 3:
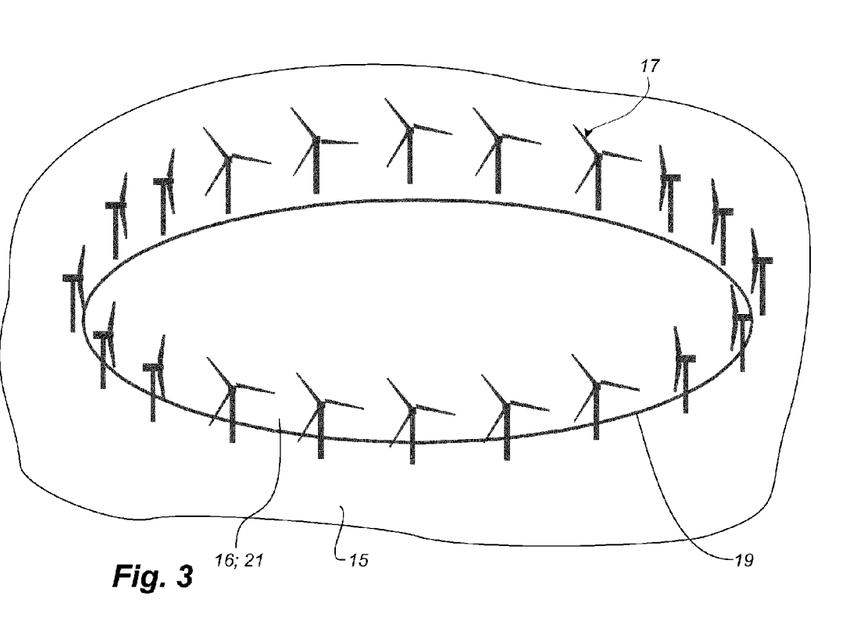
FIG. 3 shows a perspective plan view of a wind farm according to the invention.

As shown in FIGS. 2 and 3, the wind farm comprises a ground comprising a first ground portion 16 and a second ground portion 15 surrounding the first ground portion 16. The first ground portion 16 has a first ground surface 18 and a periphery 19 and is covered with a reflecting first artificial covering 20 so as to provide the first ground portion 16 with a reflecting surface having an albedo higher than the albedo of the surrounding second ground portion 15 having a second ground surface 22. Thereby and as described previously, the temperature in the first ground portion 16 will be lower than in the second ground portion 15 on a sunny day, and the temperature difference between the mentioned two ground portions will increase over time as the first ground portion not heated so much due to sunlight. As a result and as described previously, the result is the generation of air circulation comprising a wind 13 at low altitude having a wind speed in a direction from the colder first ground portion 16 to the warmer second ground portion 15.

The wind farm according to the invention further comprises a plurality of wind turbines 17 arranged in the second ground portion. They are arranged in such a distance from the periphery of the first ground that they are subjected to the wind 13 coming from the first ground portion, as shown in FIGS. 2 and 3.

In the embodiment shown, the reflecting first covering 20 is formed by a plurality of mirrors 23 arranged on the first ground surface 18. The first ground surface has, if necessary, been leveled in order to provide a smooth surface.

Figure 4:
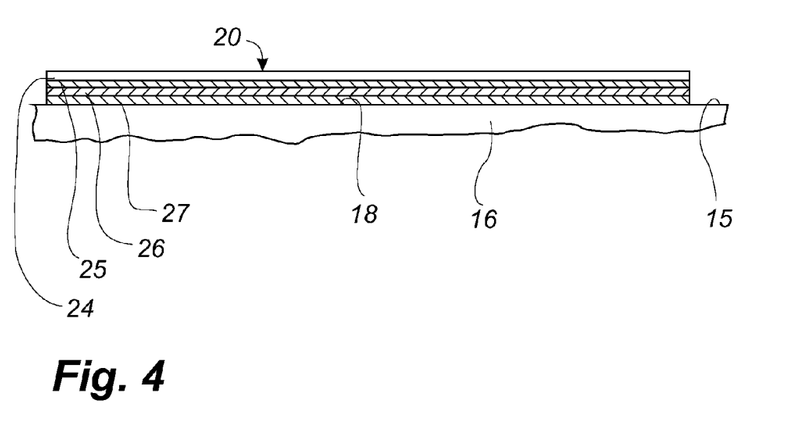
FIG. 4 shows a sectional view of a mirror of which a plurality is arranged in the first ground portion so as to form a reflecting covering thereof.

As shown in FIG. 4, each mirror 23 comprises an upper highly transparent upper layer 24, preferably a glass layer or a polymer layer, a subjacent highly reflecting layer 25, such as an aluminum layer in the form of an aluminum foil or sheet or a metallization layer, and a lower protecting layer 26, such as a polymer sheet. Finally, a bottom layer 27 in the form of an insulating layer, such as a sheet of a foamed polymer is attached to the lower surface of the lower layer. The size of the mirrors can as an example be 1 m×2 m for convenient handling.

Figure 5:
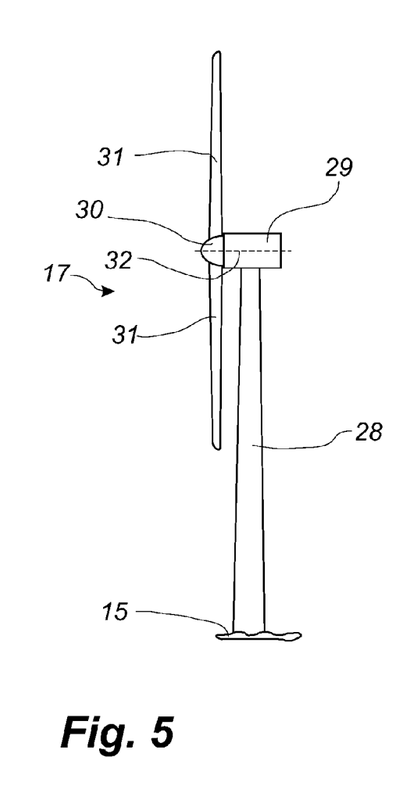
FIG. 5 shows a lateral view of a wind turbine of the Danish type arranged in the second ground portion.

In the embodiment shown, the wind turbines 17 are of the so-called Danish type comprising a tower 28 and on top of the tower a nacelle 29 with a rotor 30 provided with three blades 31 and supported by a rotor axis 32 as shown in FIG. 5.

The reflecting first artificial covering of the first ground portion 16 formed by the mirrors 23 will on a sunny day reflect up to 86-95% of the energy back to space while the surface of the surrounding second ground portion 15 will reflect about 26-29% of the energy back to space when the site of the wind farm is a desert.

The large difference in albedo will over time cause a large difference in the temperature in the air above the first and the second ground portion. Assuming that the temperature above the first ground portion 16 is 15 degrees and above the second ground portion 15 is 35 degrees and the area of the first ground portion 15, i.e. the reflecting surface 21, is 1 km$^2$, then the wind speed of the wind from the first to the second ground portion and to which the wind turbines 17 are subjected can be estimated to be as a maximum 26 m/s, as it appears from the previous example. Even though the wind speed in practice will be lower than 26 m/s, it is expected that the wind speed will be at such a level that the wind turbines work efficiently. Additionally, it should be noted that at present it is expected that the wind speed increases with an increasing area of the reflecting surface of the first ground portion.

With the same assumptions as in the previous example the theoretical maximum wind speed from the first to the second ground portion will be 59.5 m/s if the area of the reflecting surface of the first ground portion is 5 km$^2$. However, as mentioned in practice, the wind speed will be somewhat lower.

Figure 6:
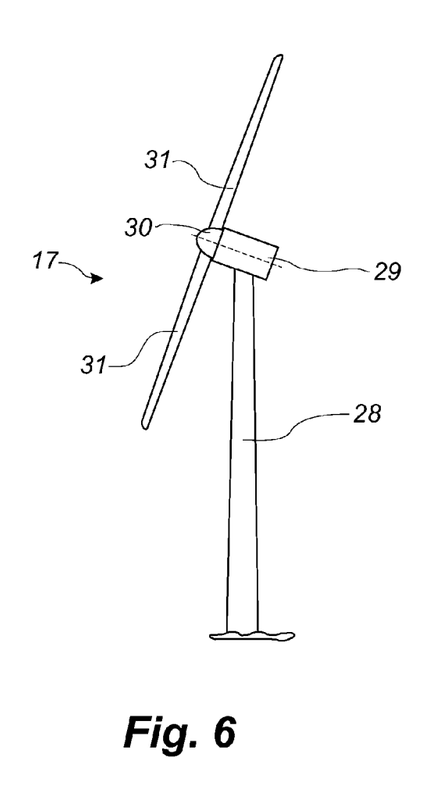
FIG. 6 shows a lateral view of a modified wind turbine having an upwardly tilted nacelle and thereby an upwardly tilted rotor axis.

The wind coming from the first ground portion 16 may not be parallel with the ground surface. It is believed that the wind 12 flowing downwardly towards the first ground portion 16 may gradually change into an essentially horizontal wind. It can therefore be advantageous that the rotor axis and preferably also the nacelle of the wind turbines are tilted upwardly so that it is essentially parallel with the wind coming from the first ground portion, as shown in FIG. 6.

The tilt of the axis can be highest for the wind turbines closest to the periphery of the first ground portion and decrease with increasing distance from the periphery of the first ground portion. The tilt can be at least 5, 10, 15, 20, 25 or 30 degrees.

LIST OF REFERENCE NUMERALS

1 Rising air
2 Descending air
3 Sea breeze
4 Return flow
5 Land
6 Sea
11 Rising air flow
12 Descending air flow
13 "horizontal" wind
14 Return air flow
15 Second ground portion
16 First ground portion
17 Wind turbines
18 First ground surface
19 Periphery
20 Reflecting first covering
21 Reflecting surface
22 Second ground surface
23 Mirrors
24 Upper layer
25 Subjacent layer
26 Lower layer
27 Bottom layer
28 Tower
29 Nacelle
30 Rotor
31 Blades
32 Rotor axis
HI High pressure at low altitude
Hh High pressure at low altitude
Ll Low pressure at low altitude
Lh High pressure at high altitude
a Distance

The invention claimed is:

1. A wind farm comprising:
 a plurality of wind turbines arranged on a ground, the ground comprising:
  a first ground portion having a first ground surface and an outer periphery; and
  a second ground portion having a second ground surface and surrounding wholly or partly the first ground portion,
  wherein the first ground portion is covered with a reflective first artificial covering configured to provide the first ground portion with a reflecting surface having an albedo higher than an albedo of the surrounding second ground portion and generate;
   a lower temperature and a higher pressure in the first ground portion than in the second ground portion, and
   a wind having a wind speed in a direction from the first ground portion towards the second ground portion; and
  wherein at least some of the wind turbines are arranged in the second ground portion in such a distance from the outer periphery of the first ground portion that they are subjected to the wind coming from the first ground portion.

2. The wind farm according to claim 1, wherein the reflective first artificial covering is formed by a liquid or granular coating applied to the first ground portion and is configured to provide the reflective surface.

3. The wind farm according to claim 1, wherein the reflective first artificial covering is formed by a plurality of flexible or rigid mirrors or mirror-like sheet elements arranged in the first ground portion.

4. The wind farm of claim 1, wherein the albedo of the reflective first artificial covering is at least between 50% and 90%.

5. The wind farm of claim 1, wherein a difference between the albedo of the first ground portion and the albedo of the second ground portion is at least between 30% and 80%.

6. The wind farm of claim 1, wherein the albedo of the reflecting surface is configured to cause a temperature difference of at least between 1 and 35 degrees Celsius between the first ground portion and the second ground portion.

7. The wind farm of claim 1, wherein an area of the reflective surface is at least between 0.3 and 50 km$^2$.

8. The wind farm of claim 1, wherein an area of the first ground portion having the reflective first artificial surface and a difference in albedo between the first and the second ground portions is chosen such that a temperature difference of at least between 1 and 35 degrees Celsius occurs between the first ground portion and the second ground portion.

9. The wind farm of claim 1, wherein an area of the first ground portion having the reflective first artificial surface and a difference in albedo between the first and the second ground portions are chosen such that a temperature difference of at least between 1, and 35 degrees Celsius occurs between the first ground portion and the second ground portion when at least one of the wind turbines is subjected to a wind speed of at least between 2 m/s and 6 m/s.

10. The wind farm of claim 1, wherein the first ground portion is covered with a surface providing a Goldberg-Mohr friction coefficient k between said surface and a wind of less than between 0.1 and 0.03 s$^{-1}$.

11. The wind farm of claim 1, wherein the second ground portion is covered with a second artificial covering having an albedo lower than the albedo of the reflective first artificial coating.

12. The wind farm according to claim 11, wherein the second covering is formed by a granular or liquid coating applied to the second ground portion configured to provide the albedo lower than the albedo of the reflective first artificial coating.

13. The wind farm according to claim 11, wherein the second covering is formed by a plurality of flexible or rigid sheet elements arranged on the second ground portion.

14. The wind farm according to claim 1, wherein the reflective first artificial covering is arranged on and/or supported on a leveled ground surface.

15. The wind farm of claim 1, wherein the second ground surface has a leveled ground surface.

16. The wind farm of claim 1, wherein at least some of the wind turbines are in the second ground portion and are arranged on a line being essentially parallel with the outer periphery of the first ground portion so as to be arranged essentially in the same distance from said outer periphery.

17. The wind farm of claim 1, wherein at least some of the wind turbines are, in the second ground portion and are arranged on a closed curve being essentially parallel with the outer periphery of the first ground portion so as to be arranged in essentially the same distance from said outer periphery.

18. The wind farm of claim 1, wherein at least some of the wind turbines are Danish type Horizontal Axis Wind Turbines (HAWT) comprising a tower and, on top of the tower, a nacelle with a rotor provided with three or fewer blades.

19. The wind farm of claim 1, wherein at least some of the wind turbines are Vertical Axis Wind Turbines (VAWT).

20. The wind farm of claim 1, wherein a wind barrier is provided between adjacent wind turbines of the plurality of wind turbines, said wind barrier being arranged so as to reduce an amount of wind leaving the first ground portion without passing an area covered by a rotor of one of the plurality of wind turbines.

21. The wind of claim 1, wherein the first ground portion with the reflecting surface has a shape with a high area to circumference ratio.

* * * * *

UNITED STATES PATENT AND TRADEMARK OFFICE
CERTIFICATE OF CORRECTION

PATENT NO. : 9,897,075 B2  
APPLICATION NO. : 15/037211  
DATED : February 20, 2018  
INVENTOR(S) : Peter Grabau It is certified that error appears in the above-identified patent and that said Letters Patent is hereby corrected as shown below:

In the Claims

Claim 17, Column 11, Line 4, delete "," after "are".

Signed and Sealed this
First Day of May, 2018

Andrei Iancu
*Director of the United States Patent and Trademark Office*